(12) United States Patent
Shoroff et al.

(10) Patent No.: US 6,381,602 B1
(45) Date of Patent: Apr. 30, 2002

(54) ENFORCING ACCESS CONTROL ON RESOURCES AT A LOCATION OTHER THAN THE SOURCE LOCATION

(75) Inventors: Srikanth Shoroff, Issaquah; F. Soner Terek, Bellevue; Sankrant Sanu, Redmond; Andrew Wallace, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/238,012

(22) Filed: Jan. 26, 1999

(51) Int. Cl.[7] .............................................. G06F 17/30
(52) U.S. Cl. ................. 707/9; 707/10; 707/1; 709/217
(58) Field of Search ..................... 707/9, 10, 1; 709/217

(56) References Cited

U.S. PATENT DOCUMENTS

| | | | | |
|---|---|---|---|---|
| 5,239,648 A | * | 8/1993 | Nukui .......................... 707/9 |
| 5,604,490 A | * | 2/1997 | Blakley, III et al. .... 340/825.31 |
| 5,634,053 A | * | 5/1997 | Noble et al. .................... 707/4 |
| 5,970,490 A | * | 10/1999 | Morgenstern ................ 707/10 |
| 5,983,267 A | * | 11/1999 | Shklar et al. ................ 709/217 |
| 6,044,373 A | * | 3/2000 | Gladney et al. .............. 707/10 |
| 6,044,378 A | * | 3/2000 | Gladney et al. ............ 707/103 |
| 6,185,567 B1 | * | 2/2001 | Ratnaraj et al. ............. 707/10 |
| 6,216,014 B1 | * | 4/2001 | Proust et al. ................ 455/558 |
| 6,226,649 B1 | * | 5/2001 | Bodamer et al. ........... 707/104 |
| 6,263,342 B1 | * | 7/2001 | Chang et al. ............... 707/103 |

\* cited by examiner

Primary Examiner—Paul R. Lintz
(74) Attorney, Agent, or Firm—Workman, Nydegger, Seeley (57) ABSTRACT

Systems and methods for enforcing access control on secured documents that are stored outside of the direct control of the original application that would normally store and govern access to the documents. Access security can be enforced at a search engine associated with an indexing system that compiles references to documents at any number of network locations. The search engine discloses to the requesting user only those documents that the user is authorized to read. If a document is identified for potential disclosure to a user, and the document's source location has an access control system that is not directly interoperable with a native access control system of the search engine, a security provider at the search engine enforces access control. The security provider, in cooperation with the source location of the document, converts the user context that identifies the requesting user to a format that can be used by the security provider. The security provider also retrieves the access control information from the document's source location. The security provider then applies the user context to the access control information to determine if the user is authorized to read the document.

9 Claims, 6 Drawing Sheets

ENFORCING ACCESS CONTROL ON RESOURCES AT A LOCATION OTHER THAN THE SOURCE LOCATION

BACKGROUND OF THE INVENTION

1. The Field of the Invention

The present invention relates to controlling users' access to documents or other resources stored on computer systems. More specifically, the present invention relates to enforcing access control criteria associated with documents at network locations other than the source data storage locations at which the documents have been created or stored.

2. The Prior State of the Art

One of the reasons that computer networks have become widely used during recent years involves the ability to make documents or other resources easily accessible by multiple users. For instance, documents stored at a data storage location associated with a file server can be made available to any number of users at remote locations. Many documents created or stored on a computer network are intended to be read or otherwise accessed only by certain individuals. Accordingly, there have been developed various techniques for permitting only authorized users to access sensitive documents.

In the absence of computer networks, computer-generated documents can be protected from unauthorized access relatively easily. Documents stored by a non-networked computer can be seen only by users having physical access to the computer or to associated data storage devices, such as floppy disks, on which the documents are stored. Most access control systems used in networked environments involve compiling access control information. Access is regulated by comparing the identity of the requesting user with the access control information of the stored data, thereby determining whether the requesting user is authorized to gain access.

In a typical access control system, the access control information exists in the form of access control lists (ACLs). An access control list generally includes at least a security identifier and a permission (or right). The security identifier specifies a particular user or group of users whose access is to be regulated by the ACL. The permission represents the type of access (i.e., read or write access) that the user is to be granted or denied. Security is enforced by comparing the user context (i.e., a code representing the identity of a user requesting access to a document) with the security identifiers and associated permissions listed in the ACL.

While ACLs and other mechanisms for defining access privileges of users have been successfully used to regulate users' access to sensitive documents in networked environments, it has been found that many access control systems are not interoperable one with another. For instance, the format of the security identifier can vary from operating system to operating system. A first access control system might employ security identifiers having the format "domain/user", where "user" represents a user name associated with the user and "domain" represents the domain of the user, while a second access control system could use the name of a mailbox of the user or distribution lists in which the mailbox is included as the security identifier. In this case, the first access control system would not be able to interpret or apply the security identifiers of the second access control system. Conventionally, the user contexts that the access control system compares with the contents of the ACLs must be in the same format as the security identifiers. Moreover, the semantics and protocols for storing access control information in ACLs and comparing the user contexts with the ACLs can vary from system to system, thereby further preventing interoperability in the prior art.

When an access control system is established at a computer system, the computer system has generally been capable of regulating access to documents that are stored at the computer system or are otherwise in its control. However, one can imagine a networked system in which it may be desirable to protect information that is not stored at or in the control of the original computer system at which the access control lists are compiled and enforced. In one example, it may be desirable to establish an indexing system that creates a searchable index containing information that is stored at various locations in a computing environment. For instance, the information in the index could be gathered by a crawler application that gathers the information from one or more locations in the network.

In order to create a useful index of information stored in a network, the index often needs to include information that is protected from unauthorized access at its source. Conventionally, the indexing system has no way of knowing what access restrictions have been imposed on the indexed data by the source application or computer system, particularly when the indexing system does not have a native access control system that is directly compatible with the indexed data's source access control system. Likewise, the source application or computer system has no way of enforcing its access control on its data once it has been stored outside of its control at the indexing system. This problem is not limited to indexing systems, but would be generally experienced any time that secure data is to be stored outside of the direct control of its source access control system. As a result, the above-described indexing systems and other such applications have not been practical, particularly in environments where data security is important.

In view of the foregoing, it would be an advancement in the art to provide methods and systems for allowing applications and computer systems to enforce access control on their own data after the data has been stored outside of their direct control. It would be desirable to enable indexing systems to gather information stored at other locations in a network system without exposing otherwise secure information to unauthorized access.

SUMMARY AND OBJECTS OF THE INVENTION

The present invention relates to enforcing access control on secured documents that are stored outside of the direct control of the original application that would normally store and govern access to the data. According to the invention, an indexing application or any other application that stored data outside the control of the source application is adapted to cooperate with the source application to enforce access control. Users are permitted to read documents only if the user is granted read permission in accordance with the access control system of the source application.

The invention can be implemented in a network environment that includes an indexing system that compiles references to documents stored at various source locations, some of which can have access control systems that are not interoperable with the native access control system of the indexing system. According to this implementation of the invention, the indexing system can apply the access control that protects the documents at their source locations. In this way, the invention can be used to filter documents that satisfy search requests executed by the indexing system. Only those documents that the requesting user is authorized to read are disclosed to the user.

According to one aspect of the invention, the indexing system has a security provider for each access control system that protects indexed documents and is not compatible with the native access control system of the indexing system. The security provider is a program module that enforces access security on documents in accordance with the access control system that protects the documents at their source location.

When a search request identifies one or more documents that are to be potentially disclosed to a user, the search engine only discloses the documents that the user is authorized to read. When a search request is issued and a document is identified for potential disclosure to the user, the appropriate security provider, in cooperation with the source location of the document, translates the user context that identifies the user to a format that is compatible with the security provider and the corresponding access control system. For example, the user context associated with the search request may have a format "domain\user", which represents one way of identifying the requesting user. Furthermore, the security provider and the source location of the document might then convert the user context to a translated user context that represents the mailbox and distribution lists that are associated with the user at the document source location. In any event, the translated user context identifies the requesting user in a way that can be used by the security provider.

The security provider then applies the appropriate user context to the access control list associated with the requested document. The access control list can be obtained by the security provider in one of several ways. First, the access control list can be retrieved during the process of compiling the index and stored at the indexing system. Second, the access control list can be transmitted from the source application to the security provider during the process of responding to a search request. In the latter alternative, the access control list can be cached for later use by the security provider.

According to yet another approach, the access list is not obtained by the security provider, but the access control can be enforced by the source application. In particular, the security provider obtains a user context that is compatible with the access control system at the source application. The security provider then impersonates the user by appearing, from the standpoint of the source program, as if it were the user requesting read access to the document. According to this approach, the source application would then apply the access control list to the user context, thereby determining whether the requesting user has read permission with respect to the document.

If the access control list indicates that the user, as identified by the user context, has read permission, the document, portions thereof, or its existence, is disclosed to the user as part of the search results. If the user is not authorized to read the document, it is discarded and is not included in the search results. In this manner, the systems and methods of the invention can enforce access control on search results in the indexing system. Thus, unauthorized persons will not have access to secured documents. The foregoing systems and methods permit indexing systems to fully access all documents in a network system, regardless of their source locations and the security measures applied to them, without compromising the secure nature of the documents.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to enforcing access control on secured documents that are stored outside of the direct control of the original application that would normally store and govern access to the documents. For instance, the present invention can be used to enforce document security at an indexing system in a networked environment, where the indexing system references documents stored at one or more source data storage locations that have different access control systems.

The invention is described below by using diagrams to illustrate either the structure or processing of embodiments used to implement the systems and methods of the present invention. Using the diagrams in this manner to present the invention should not be construed as limiting of its scope. The embodiments of the present invention may comprise a special purpose or general purpose computer including various computer hardware, as discussed in greater detail below.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer. When information is transferred or provided over a network or another communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
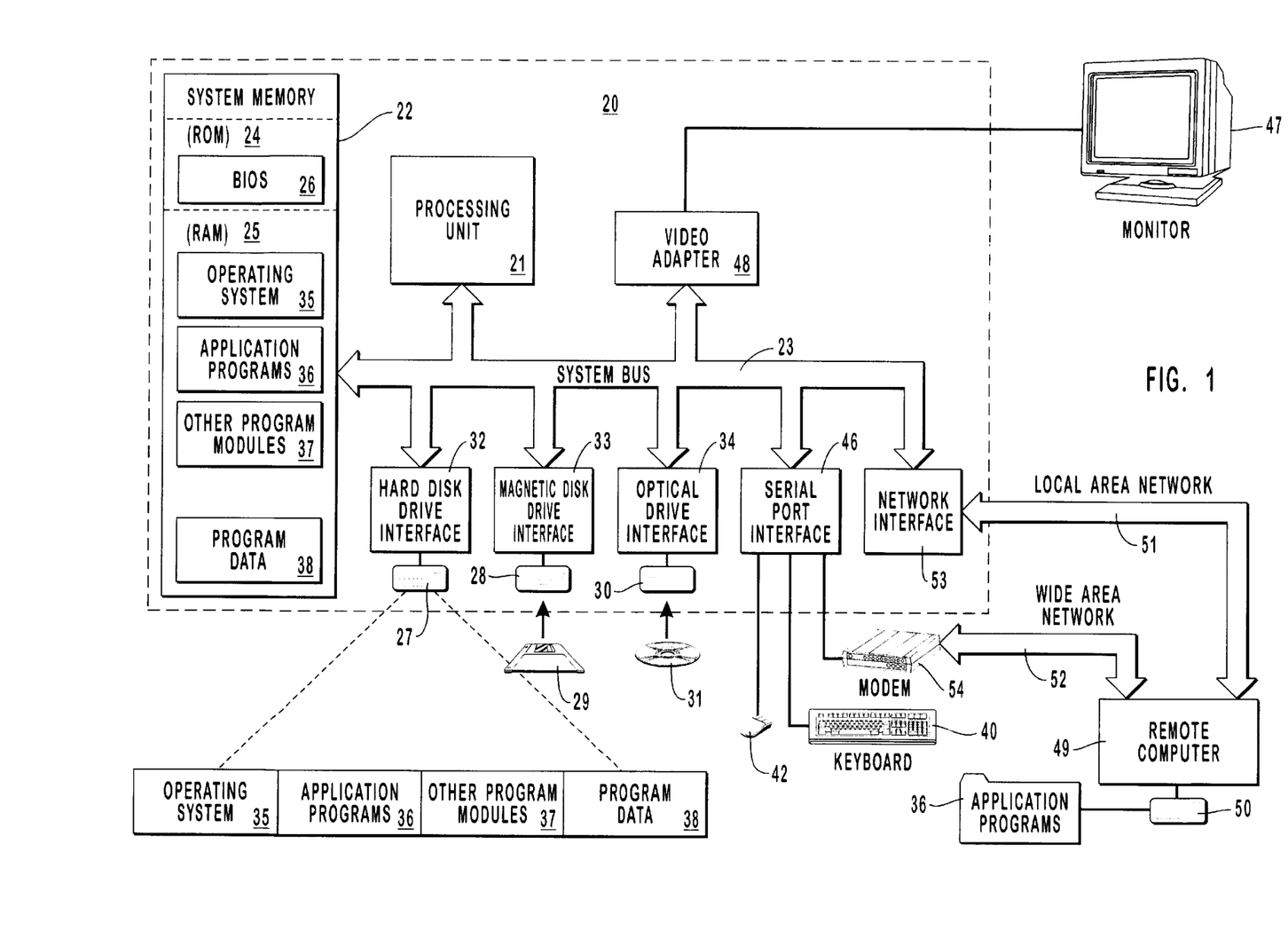
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk, a removable magnetic disk 29 and a removable optical disk 31, other types of computer readable media for storing data can be used, including magnetic cassettes, flash memory cards, digital video disks, Bernoulli cartridges, RAMs, ROMs, and the like.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
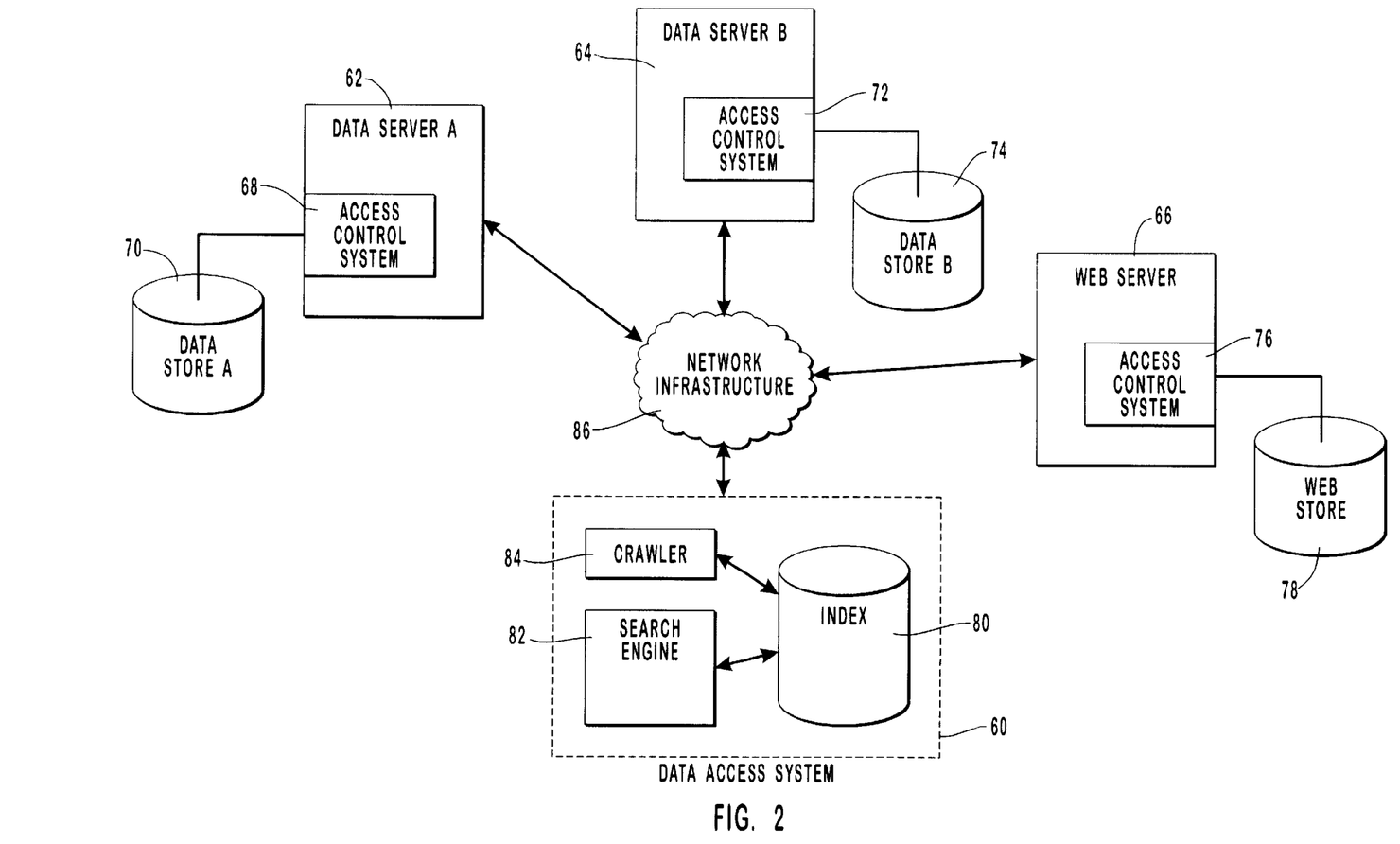
FIG. 2 is a schematic diagram illustrating an exemplary network environment in which the invention can be implemented.

FIG. 2 illustrates one suitable network environment in which the invention can be used. In FIG. 2, a data access system 60 indexes documents and other resources stored at other locations in the network environment and makes references to the documents available in a fill-text or other searchable format. The network environment also includes a data server A 62, data server B 64, and a web server 66. In general, the network in which the present invention can be used can include one or more data servers, web servers, or other computer systems at which documents or other resources are stored. Moreover, the various data servers, web servers, etc. can have operating systems employing different access control systems, which may or may not be compatible one with another in the absence of the interoperability features disclosed herein. As used herein, the term "document" extends to any computer-generated or computer-stored data or data structure that can be protected by an access control system. The term "document" shall be further construed, unless otherwise indicated, to include other computer resources that can be protected by an access control system. "Disclosure" of a document refers to making known the contents or the existence of all or part of a document.

In this example, it will be assumed that data server A 62 has an access control system 68 that regulates access to documents in data store A 70 using security identifiers having the format "domain\user". In this case, data server A 62 could be a server operating a Microsoft Windows NT® operating system. Data server B 64 will be assumed to have an access control system 72 that regulates access to documents in data store B 74 using mailbox names and distribution lists as the security identifiers. Thus, data server B 74 can be a server operating Microsoft Exchange. Although the invention will be described below primarily in the context of the access control systems having the foregoing characteristics, it should be understood that the principles disclosed herein can be applied to substantially any access control systems to enable enforcement of access security on documents at indexing systems or any other location in a network environment.

To illustrate the extensible nature of the invention, the network environment of FIG. 2 is shown as including a web server 66 having an access control system 76 that regulates access to web documents in web store 78. The principles disclosed herein can be used to enforce security on the web documents stored in web store 78.

Data access system 60 is an indexing system that represents one example of the data access systems at which document security can be enforced according to the invention. Alternatively, data access system 60 can be a proxy server, a real-time searching application, or another network location or application that provides access to documents or other network resources. Data access system 60 includes an index 80, a search engine 82, and a crawler 84. Crawler 84 accesses data store A 70, data store B 74, and web store 78 via network infrastructure 86, which can be any local area or wide area network. Crawler 84 compiles references to the documents stored at the various data stores 70, 74, and 78 and stores the references in index 80, thereby enabling users to perform full-text or other searches of the documents stored in the network environment of FIG. 2. Although data stores 70, 74, and 78 are located at different computers in the embodiment of FIG. 2, some or all of the data store or stores can be located at the same computer as data access system 60 in an alternative embodiment.

In order for crawler 84 to fully index the documents in the network environment of FIG. 2, the crawler is granted full access privileges to substantially all documents. Of course, if crawler 84 operates with full access credentials to documents in the networked environment, references to secured documents will be included in index 80. Without some mechanism for allowing data server A 62, data server B 64 and web server 66 to enforce access control on the data assembled in index 80 or for enabling data access system 60 to enforce access control on their behalf, unauthorized users could learn of the contents or the existence of the secured documents. Accordingly, the invention disclosed herein provides systems and methods for enforcing the appropriate access control at data access system 60 with respect to documents referenced in index 80.

Figure 3:
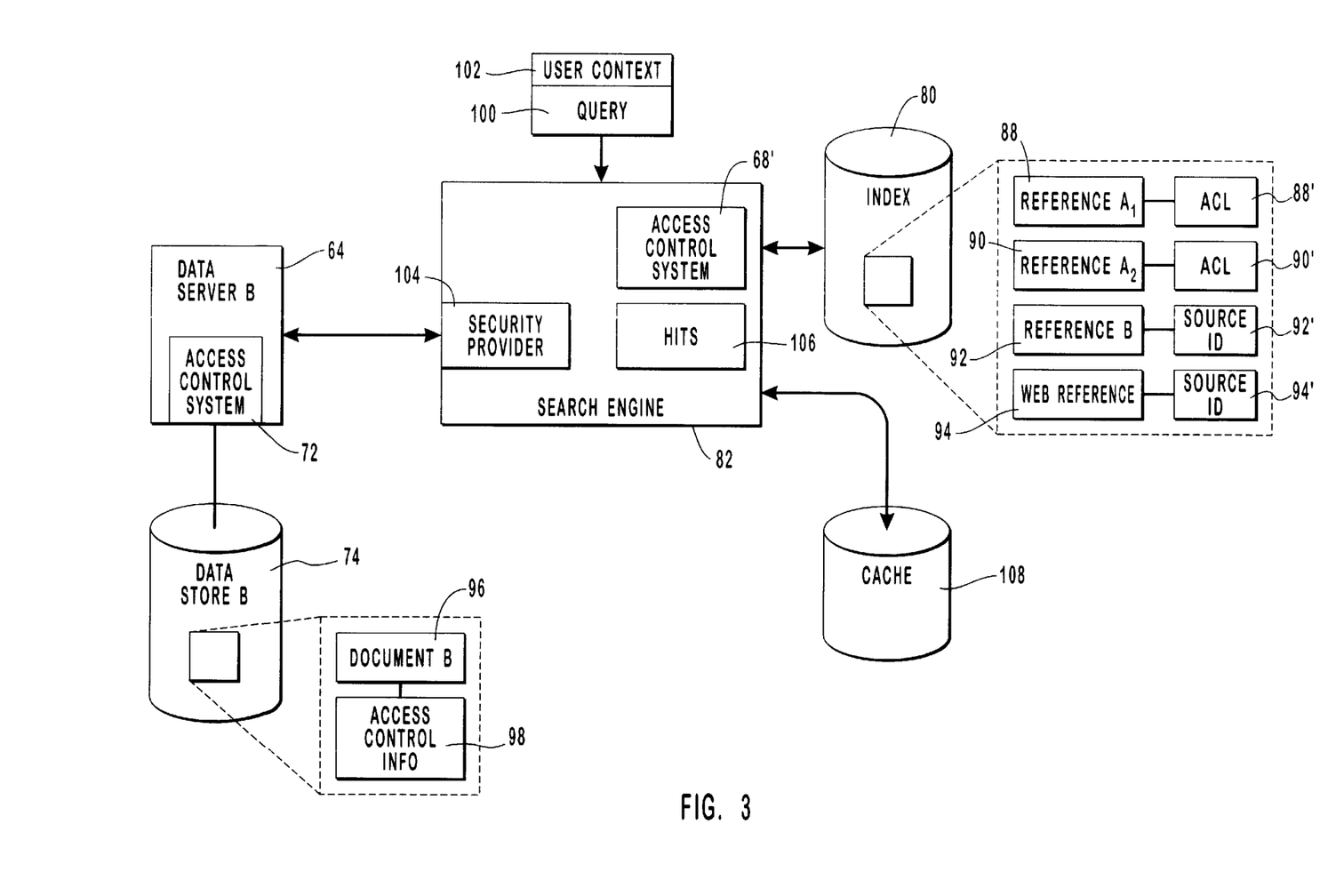
FIG. 3 is a schematic diagram depicting an initial stage of a method for enforcing access control on a document at a location other than the source location of the document according to one embodiment of the invention.

FIG. 3 illustrates in greater detail one embodiment of the methods whereby access control is enforced for documents compiled by the data access system. In this example, it is assumed that search engine 82 operates under an operating system having a native access control system 68' that is the same as or compatible with access control system 68 of data server A 62 illustrated in FIG. 2. In other words, the access control systems are compatible in the sense that they use security identifiers having the same format and use the same semantics for applying user contexts to the access control information. In this example, since it has been assumed that access control system 68 of FIG. 2 uses security identifiers having the format "domain\user" it will also be assumed that access control system 68' of search engine 82 uses security identifiers having same format. This could be the case if search engine resides at a server operating Windows NT®. Accordingly, access control system 68' can directly interpret access control lists associated with documents originating at data store A 70 of FIG. 2. In other embodiments, access control system 68' can instead be compatible with access control system 72 of FIG. 2. Alternatively, search engine 82 could have any other kind of native access control system or none at all.

As shown in FIG. 3, the crawler has compiled references 88, 90, 92, and 94 at index 80. References 88, 90, 92, 94 are merely representative of any number of references having any source that can be compiled at index 80. In this example, references 88 and 90 are designated, respectively, as reference $A_1$ and reference $A_2$ associated with documents stored in data store A 70 of FIG. 2. Reference 92 is designated as reference B that corresponds to document B 96 stored at data store B 74. Document B 96 has associated therewith access control information 98, which in this example, has user mailboxes and distribution lists as the security identifiers. Reference 94 is designated as a web reference that corresponds to a web document stored in web store 78 of FIG. 2.

Each reference 88, 90, 92, and 94, stored in index 80 has associated therewith information that enables the systems and methods of the invention to apply access control. As references $A_1$ and $A_2$ were compiled by the crawler, the corresponding access control lists 88' and 90' were retrieved from the source location (i.e., data server A 62 of FIG. 2) of the corresponding documents and stored in index 80 as shown in FIG. 3. It is noted that ACLs 88' and 90' are compatible with the native access control system 68' of search engine 82. If references $A_1$ and $A_2$ are requested by a user, access control system 68' can directly apply access control lists 88' and 90' to the user context associated with the user request. Storing ACLs 88' and 90' at index 80 illustrates one technique for providing search engine 82 with the information needed to enforce access security in accordance with access control system 68 of the source data server A 62. Alternatively, ACLs 88' and 90' could be replaced at index 80 with information that permits a security provider at search engine 82 to obtain the ACLs during the process of responding to a search request. This alternative approach is described below in reference to source ID 92' and 94'.

When the crawler compiled reference B 92 at index 80, it noted that reference B was protected at its source location by an access control system 72 that is not directly compatible with access control system 68'. In response, the crawler retrieved the information that was necessary to permit security provider 104 to enforce document security in accordance with access control system 72. The operation of security provider 104 will be disclosed in greater detail below. In this example, the information retrieved by the crawler and stored with reference B 92 at index 80 is a source ID 92'. Source ID 92' can indicate the nature of the access control system 72 that protects document B 98 and can further specify that data server 64 is the source of document B. Similarly, a source ID 94' is linked with web reference 94 at index 80.

For each type of access control system that protects documents referenced in index 80 and is not directly compatible with access control system 68', a security provider is registered with search engine 82. Security provider 104 provides the functionality at search engine 82 that permits access control to be applied to reference B 92 in accordance with access control system 72. Although, for purposes of illustration, only security provider 104 is depicted in FIG. 3, there are as many other security providers registered at search engine 82 as needed to enforce access control for the other references, such as web reference 94, stored in index 80.

Once references 88, 90, 92, and 94 are compiled at index 80, a user can issue a query 100 to search engine 82 requesting selected references stored in index 80. Query 100 is accompanied by a user context 102, which is a code or another user identifier representing the identity of the user. In response to query 100, search engine 82 determines which of the references 88, 90, 92, and 94 satisfy the query and compiles hits 106 according to techniques that will be understood by those skilled in the art. Hits 106 represent documents that are identified for potential disclosure to the user. As used herein, an application can determine that a document is to be "potentially disclosed" to a user, regardless of whether the application is an indexing system, a proxy server, or any other type of data access system. Security provider 104 also has a cache 108 associated therewith, which provides functions that will be disclosed in greater detail below.

Figure 4:
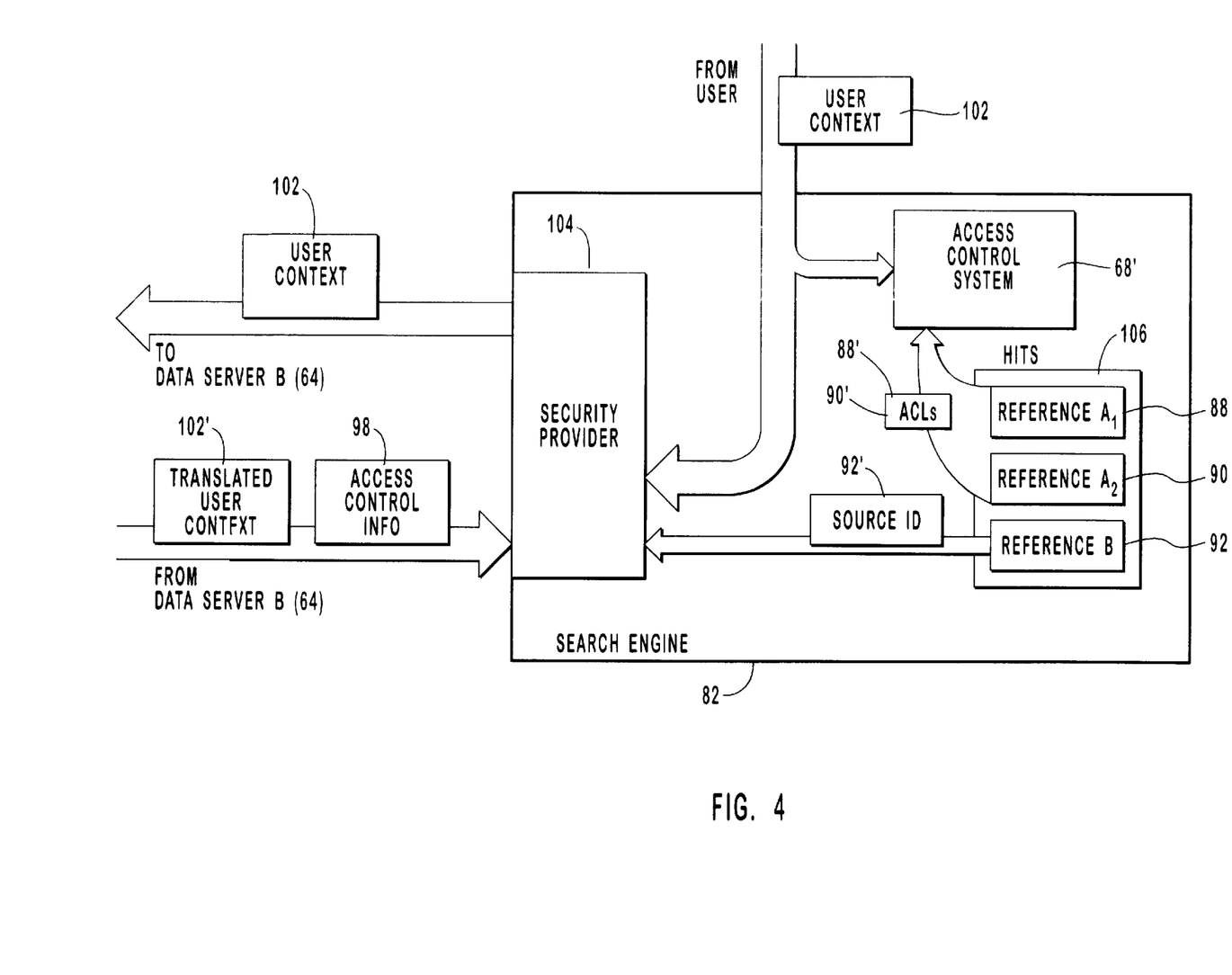
FIG. 4 is a schematic diagram illustrating in greater detail the method of FIG. 3.

In the example depicted in FIG. 4, a query issued by the user returns reference $A_1$ 88, $A_2$ 90, and reference B 92 as hits 106. Before disclosing the existence or the contents of the documents associated with hits 106 to the user, search engine 82 first determines whether the user has read permission with respect to the documents. For references $A_1$ and $A_2$, the process of enforcing access security is relatively straightforward. Access control system 68' compares user context 102 with the security identifiers included in access control lists 88' and 90' according to conventional techniques. Reference B 92, however, is associated with document B 96 protected by access control system 72 that is not directly compatible with access control system 68'. Based on source ID 92', search engine 82 determines that access control should be enforced on reference B 92 by security provider 104.

In this embodiment, in order to enforce access security on reference B 92 in accordance with access control system 72, security provider 104 needs to convert user context 102 to a format compatible with the security identifiers of access control system 72. In this example, user context 102 is in the format "domain\user", while the security identifiers associated with access control system 72 consist of mailbox names and distribution lists. Accordingly, this embodiment of the systems and methods of the invention performs a mapping from the original user context 102 to the corresponding mailbox names and distribution lists.

To perform the mapping, security provider 104 transmits the user context 102 to data server B 64 as depicted in FIG. 4. For instance, user context 104 may be "accounting\tammy", representing that the query 100 is associated with a user having a user name "tammy" and a domain name "accounting." Data server B 64 receives the user context 104 and determines the identity of the user context of access control system 72 that corresponds to user context 104. In this example, data server B 64 determines the identity of the user context of access control system 72 that corresponds to "accounting\tammy".

Since user contexts and security identifiers compatible with access control system 72 consist of the user's mailbox name and any distribution lists that contain the mailbox, data server B 64 determines which mailbox has as its primary user "accounting\tammy". In this example, data server B 64 may determine that "accounting\tammy" represents the primary user for a mailbox named "tammymb". Data server B 64 then determines which distribution lists include the identified mailbox name. Thus, data server B 64 could determine that the distribution lists "accounting" and "CPA" include "tammymb". In response to the foregoing steps, data server B 64 transmits to security provider 104 the translated user context 102' that is compatible with access control system 72. When, as is the case in FIG. 4, access control system 72 uses mailbox names and distribution lists as user contexts and security identifiers, translated user context 102' is a user identifier that consists of the identified mailbox names and distribution lists (e.g., "tammymb" and "accounting" and "CPA"). With this information, security provider 104 can designate the identity of the user requesting access in a way that can be applied to the access control system associated with reference B 92.

In order to apply translated user context 102' security provider 104 then retrieves, according to this embodiment, access control information 98 that protects document B 96. Based on source ID 92', security provider 104 determines which access control information protects document B 96. For purposes of illustration, it is assumed in this example that access control information 98 is associated with a folder in which document B 96 resides instead of with individual documents. All documents that reside in the folder are protected with the same access control information 98. Thus, security provider 104 retrieves the access control information 98 associated with the appropriate folder at data store B 74 as shown in FIG. 4.

At this stage of the method depicted in FIG. 4, security provider now possesses the access control information 98 that protects document B 96 and the translated user context 102' that identifies the requesting user in the format that is compatible with access control information 98. Next, security provider 104 determines whether access control information 98 grants read permission to the user identified in translated user context 102'. The step of applying translated user context 102' to access control information can be conducted according to a process similar to the process that would be used by access control system 72, which will be understood by those skilled in the art upon learning of the disclosure made herein.

In another embodiment, security provider 104 performs functions that result in the enforcement of access control to a requested document without obtaining the access control list associated with the document. In this embodiment, security provider 104 impersonates the user instead of retrieving the ACL from access control system 72 or from index 80. For example, security provider 104 can send the user context to data server B 64 along with information that makes security provider appear to be the user requesting read access to the requested document. The user context can be translated user context 102' of FIG. 4, which is already in the proper format to be used by access control system 72. Alternatively, security provider 104 can send the raw user context 102 of FIG. 4 to access control system 72, in which case, data server B 64 would resolve user context 102 to a format that is usable by access control system 72. In either case, access control system 72 then applies the user context to access control information 98 to determine whether the user is granted permission to read the document. Security provider 104 learns whether access control system 72 has determined that the user has read permission and, if so, discloses the contents or the existence of the requested document to the user.

The foregoing embodiment can be particularly useful in cases where the security provider 104 could not easily resolve access control information 98 or apply it to translated user context 102'. Regardless of whether security provider 104 obtains the access control list directly or impersonates the user from the standpoint of the access control system, the foregoing embodiments allow data servers (e.g., data server A 62, data server B 64, and web server 66) to control access to indexed data without otherwise directly controlling or storing the indexed data. More generally, the embodiments disclosed herein allow access control to be enforced on data when the data is stored outside of the direct control of the source application or computer system that would normally store and govern access to the data.

Figure 5:
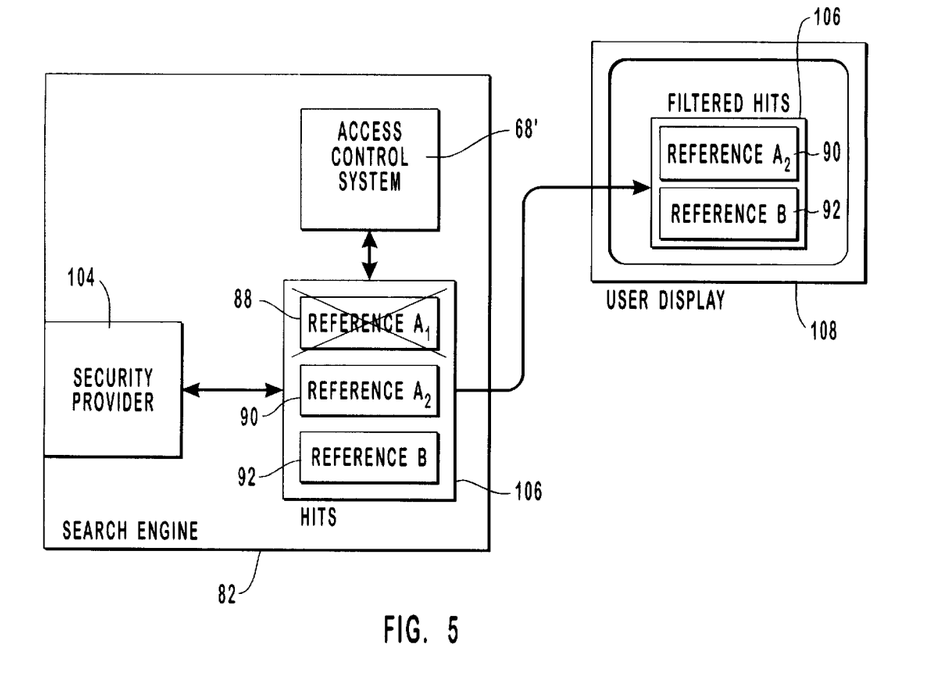
FIG. 5 is a schematic diagram illustrating an example of selectively disclosing documents after enforcing access control.

FIG. 5 further illustrates the method for selectively displaying references to the user after enforcing access control on the references. In the example illustrated in FIG. 5, access control system 68' has determined that the requesting user does not have read permission for reference $A_1$ 88 but does have read permission for reference $A_2$ 90. Similarly, security provider 104 has determined that the user has read permission with respect to reference B 92. Thus, reference A, is discarded and reference $A_2$ and reference B are displayed to the user as filtered hits 107 using user display 108. In the foregoing manner, the user becomes aware only of documents for which the user has read permission. The invention can alternatively be used to grant write or execute permission to data in accordance with the access control system of the source application or computer system.

Figure 6:
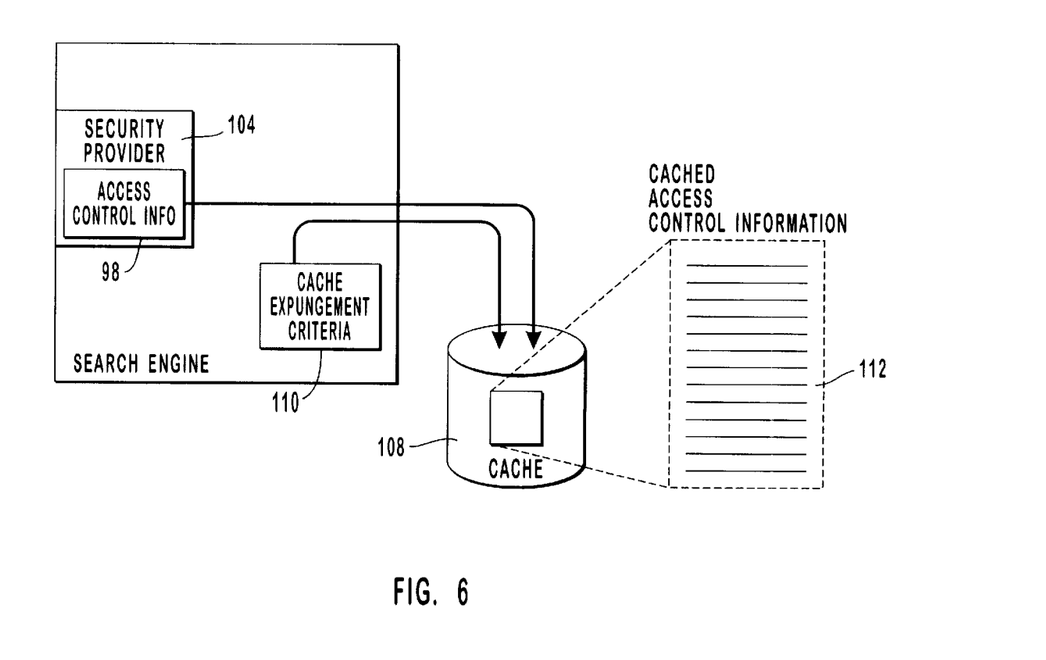
FIG. 6 is a schematic diagram depicting a technique for caching access control information retrieved from the source location of a document.

As discussed above in reference to FIG. 4, security provider 104 retrieves access control information 98 from the appropriate data server or other source location. As the number of search requests and hits grows large, security provider 104 can be required to execute a substantial number of network round trips to retrieve the appropriate access control information if there is no technique for caching access control information locally for later reuse. While the invention can be practiced without caching, it has been found that performance and throughput is improved in many situations by storing access control information in cache 108 as shown in FIG. 6. Caching can involve a tradeoff that can lead to somewhat reduced security in some instances. In particular, there is a possibility the access control list at the source access control system will be modified, such that cached access control information 112 will no longer be accurate. The magnitude of this risk depends on the duration of the caching and the frequency at which the access control lists are modified at the source access control system. The caching feature is particularly beneficial when access control information 98 is associated with a folder and applies to multiple documents. In this situation, access control information is more likely to be repeatedly used for multiple hits 106.

As security provider 104 retrieves access control information 98, it can be sent to cache 108 to be included in cached access control information 112. Likewise, translated user contexts 102' of FIG. 4 can be stored locally at cache 108 of FIG. 6, thereby eliminating a network round trip each time a user executes a subsequent query. As shown in FIG. 6, search engine 82 can include cache expungement criteria 110 that dictates the conditions under which cached access control information 112 is discarded or refreshed. For example, cache expungement criteria 110 can specify that cached access control information 112 is to be discarded after a certain time period or that cached access control information 112 is to be purged on a first-in first-out basis once the volume of the cached access control information reaches a certain amount. In either case, cache expungement criteria 110 reduce the likelihood that cached access control information 112 will become stale and will not correspond to the access control information at the documents' source data storage location.

While the invention has been described herein in reference to retrieving access control information 98 from data server B 64 as shown in FIG. 4, the invention can also be practiced by storing access control lists in the index 80 for each reference, regardless of the type of access control system that protects the documents corresponding to the reference. In this alternative embodiment security provider 104 retrieves the translated user context 102' as described, but uses the access control information persistently stored at index 80. While this alternative embodiment is operational, performance will often be poorer than performance of the embodiment illustrated in FIGS. 3–6. The embodiment of FIGS. 3–6 often requires less memory in index 80, since an entire access control list is not stored for each reference. Moreover, when access control information is persistently stored in index 80 instead of retrieved from the data server by security provider 104, there is a risk that the persistently stored access control information can become stale and no longer correspond to the updated access control information residing at the data server of the referenced documents.

Figure 7:
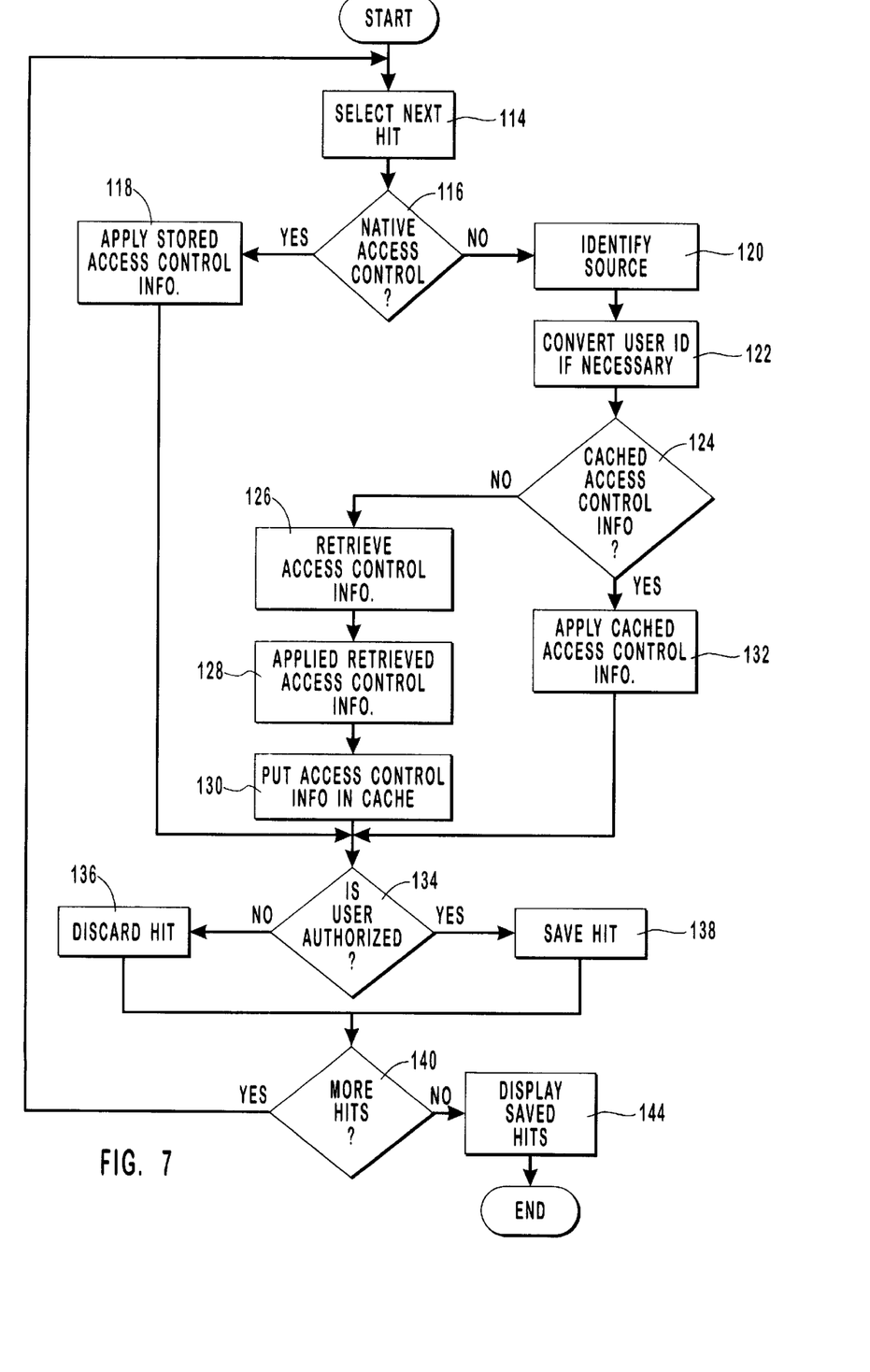
FIG. 7 is a flow diagram illustrating a method for enforcing access control at a search engine.

FIG. 7 is a flow diagram summarizing one embodiment of the methods described above in reference to FIGS. 3–6. In step 114, the indexing location selects the next hit from among one or more hits that have been compiled in response to a user search request. In decision block 116, it is determined whether the search engine operates under an operating system having a native access control system that is interoperable with the access control system associated with the document represented by the selected hit. If so, the method advances to step 118, wherein the access control list of the reference is applied to the user context of the search request.

If the native access control system is not interoperable, the method advances from decision block 116 to step 120, in which the search engine identifies the source of the document represented by the selected hit. In step 122, the corresponding security provider converts the user context associated with the search request to a format compatible with the particular access control system according to techniques disclosed herein if this step has not previously been performed. If, according to decision block 124, the access control information associated with the selected hit has not been cached, the method advances to step 126, in which the access control information is retrieved from the document's source data server. In step 128, the security provider applies the retrieved access control information to enforce access security. The retrieved access control information can then be cached, if desired, in step 130. If, on the other hand, the access control information had already been cached, the method advances from decision block 124 to step 132, in which the cached access control information is applied to enforce access security.

Regardless of the steps performed to apply the access control information to the selected hit, the method advances to decision block 134, in which the user's authorization to read the document associated with the selected hit is determined. If the user is not authorized, the method moves to step 136, in which the selected hit is discarded. If the user is authorized, the selected hit is retained according to step 138. As shown in decision block 140, if there are more hits to be processed, the method returns to step 114 in which the next hit is selected. Otherwise, the method proceeds to step 144 in which the saved hits (i.e., hits that the user is authorized to read) are displayed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by united states Letters Patent is:

1. In a networked computing environment having a first data storage location and an indexing system, wherein the first data storage location employs a first access control system to control access to documents stored at the first data storage location, and wherein the indexing system employs a second access control system to control access to documents stored at the indexing system, a method for indexing documents while preserving access security for the indexed documents, the method comprising:

maintaining, at the first data storage location, a stored copy of a first document and access control information defining user access privileges to the first document in accordance with the first access control system;

indexing the first document at the indexing system so as to create a reference to the first document in the indexing system; and     if the first and second access control systems are compatible, retrieving from the first data storage location the access control information associated with the first document and storing the access control information in the indexing system in association with the reference to the first document,     otherwise, storing, at the indexing system in association with the reference to the first document, document source location information identifying the first data storage location as the source of the first document.

2. The method of claim 1 further comprising:

receiving, at the indexing system, a query from a user, wherein the user is identified by a user context that is compatible with the access control system of the indexing system;

identifying, by the indexing system, references contained in the indexing system that satisfy the query;

for each reference identified as satisfying the query, determining, by the indexing system, whether the user has access privileges to the document to which the reference refers; and     returning, by the indexing system to the user, a response to the query listing only references to those documents to which the user is determined by the indexing system to have access privileges.

3. The method of claim 2, wherein the determining step comprises:

for each reference in the indexing system having been identified as satisfying the query and having access control information associated with it, comparing the user context with the access control information associated with the reference to determine whether the user has access privileges to the document to which the reference refers; and     for each reference having been identified as satisfying the query and having document source location information associated with it,         receiving, by the indexing system from the first data storage location, the access control information associated with the document to which the reference refers;

translating the user context to a translated user context that is compatible with the access control system of the first data storage location; and         comparing the translated user context with the access control information received from the first data storage location to determine whether the user has access privileges to the document to which the reference refers.

4. The method of claim 2, wherein the determining step comprises:

for each reference in the indexing system having been identified as satisfying the query and having access control information associated with it, comparing the user context with the access control information associated with the reference to determine whether the user has access privileges to the document to which the reference refers; and     for each reference having been identified as satisfying the query and having document source location information associated with it,         translating the user context to a translated user context that is compatible with the access control system of the first data storage location;

transmitting, by the indexing system to the first data storage location, a request for the document to which the reference refers, wherein the indexing system impersonates the user by making the request in the name of the translated user context; and         comparing, by the first data storage location, the translated user context with the access control information associated with the document to which the reference refers to determine whether the user has access privileges to such document.

5. The method of claim 3 or 4, wherein the translating step is performed by the indexing system.

6. The method of claim 3 or 4, wherein the translating step is performed by the first data storage location.

7. The method of claim 3 or 4 further comprising, for each reference having been identified as satisfying the query and having document source location information associated with it, caching the translated user context and the access control information associated with the document to which the reference refers so as to create a cached access control information.

8. The method of claim 7 further comprising periodically expunging the cached access control information in accordance with predefined cache expungement criteria.

9. A computer-readable medium having computer-executable instructions for performing the steps of claim 1, 2, 3 or 4.

* * * * *